(12) United States Patent
Naoi et al.

(10) Patent No.: US 12,243,996 B2
(45) Date of Patent: Mar. 4, 2025

(54) POWER MANAGEMENT DEVICE AND POWER STORAGE SYSTEM

(71) Applicant: TDK CORPORATION, Tokyo (JP)

(72) Inventors: Katsuo Naoi, Tokyo (JP); Takuma Mitsunaga, Tokyo (JP); Shingo Suzuki, Tokyo (JP); Masao Ichi, Tokyo (JP); Hisakazu Uto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 287 days.

(21) Appl. No.: 17/640,471

(22) PCT Filed: Mar. 23, 2020

(86) PCT No.: PCT/JP2020/012791
§ 371 (c)(1),
(2) Date: Mar. 4, 2022

(87) PCT Pub. No.: WO2021/191987
PCT Pub. Date: Sep. 30, 2021

(65) Prior Publication Data
US 2023/0006282 A1 Jan. 5, 2023

(51) Int. Cl.
*H01M 10/6563* (2014.01)
*H01M 10/48* (2006.01)
(Continued)

(52) U.S. Cl.
CPC ..... *H01M 10/6563* (2015.04); *H01M 10/482* (2013.01); *H01M 10/486* (2013.01);
(Continued)

(58) Field of Classification Search
None
See application file for complete search history.

(56) References Cited

U.S. PATENT DOCUMENTS

| 2009/0075160 A1 | 3/2009 | Tezuka et al. |
| 2010/0019729 A1 | 1/2010 | Kaita et al. |
| 2013/0004812 A1 | 1/2013 | Nishida |

FOREIGN PATENT DOCUMENTS

| JP | H08-148190 A | 6/1996 |
| JP | 2010-035280 A | 2/2010 |

(Continued)

OTHER PUBLICATIONS

Machine translation JP2015159115A (Year: 2024).*

(Continued)

*Primary Examiner* — Brian R Ohara
*Assistant Examiner* — Michelle T Leonard
(74) *Attorney, Agent, or Firm* — Oliff PLC

(57) ABSTRACT

A power management device is a power management device that controls a temperature inside a housing in a power storage system that includes a power storage device including a storage battery and the housing for housing the power storage device. The power management device includes an acquisition unit that acquires status information indicating a status of the power storage system, a calculation unit that calculates a target temperature in the housing based on an allowable capacity deterioration rate of the storage battery, and an air volume control unit that controls an air volume of a fan provided in the housing based on the status information and the target temperature.

5 Claims, 7 Drawing Sheets

(51) Int. Cl.
H01M 10/635 (2014.01)
H02J 7/00 (2006.01)
(52) U.S. Cl.
CPC ........... H01M 10/635 (2015.04); H02J 7/005 (2020.01); H02J 7/00712 (2020.01)

(56) References Cited

FOREIGN PATENT DOCUMENTS

| | | | |
|---|---|---|---|
| JP | 2010-182541 A | | 8/2010 |
| JP | 2011-192537 A | | 9/2011 |
| JP | 2015159115 A | * | 9/2015 |
| JP | 2015-195159 A | | 11/2015 |
| WO | 2006/046362 A1 | | 5/2006 |

OTHER PUBLICATIONS

Sep. 22, 2022 International Preliminary Report on Patentability issued in International Patent Application No. PCT/JP2020/012791.
Jun. 30, 2020 Search Report issued in International Patent Application No. PCT/JP2020/012791.

* cited by examiner

Fig.6

| CALORIFIC VALUE (NORMALIZED BY MAXIMUM VALUE) | - | 0.6 | 0.6 | 0.6 | 0.6 | 1 | 1 | 1 | 1 |
|---|---|---|---|---|---|---|---|---|---|
| TARGET TEMPERATURE | °C | 44 | 44 | 44 | 44 | 44 | 44 | 44 | 44 |
| AMBIENT TEMPERATURE | °C | 31 | 37 | 39 | 40 | 31 | 37 | 39 | 40 |
| REQUIRED AIR VOLUME | m³/min | 0.95 | 1.77 | 2.47 | 3.09 | 2.11 | 3.91 | 5.47 | 6.84 |
| REQUIRED NUMBER OF UNITS | UNITS | 1 | 1 | 2 | 2 | 1 | 2 | 3 | 4 |

POWER MANAGEMENT DEVICE AND POWER STORAGE SYSTEM

TECHNICAL FIELD

The present disclosure relates to a power management device and a power storage system.

BACKGROUND ART

A power storage system in which a plurality of storage batteries are housed in a housing is known (for example, see Patent Literature 1 and Patent Literature 2). In such a power storage system, the fan is controlled so that the temperature inside the housing is within a predetermined target temperature range.

CITATION LIST

Patent Literature

Patent Literature 1: Japanese Unexamined Patent Publication No. 2015-195159
Patent Literature 2: Japanese Unexamined Patent Publication No. 2010-182541

SUMMARY OF INVENTION

Technical Problem

It is known that the storage capacity of a storage battery decreases when the storage battery is repeatedly charged and discharged. When the number of charge and discharge cycles reaches a specified number, the capacity retention is required to be a prescribed value or more. In the above-described power storage system, the target temperature range in the housing is determined in advance. However, the deterioration rate of the storage capacity may change in accordance with the temperature inside the housing. Therefore, from the viewpoint of securing the capacity retention at the specified number of cycles, there is a possibility that appropriate temperature management is not performed, and there is room for improvement.

The present disclosure describes a power management device and a power storage system capable of improving temperature management in a housing.

Solution to Problem

A power management device according to one aspect of the present disclosure is a device for controlling a temperature inside a housing in a power storage system. The power storage system includes a power storage device including a storage battery and the housing for housing the power storage device. The power management device includes an acquisition unit that acquires status information indicating a status of the power storage system; a calculation unit that calculates a target temperature in the housing based on an allowable capacity deterioration rate of the storage battery; and an air volume control unit that controls an air volume of a fan provided in the housing based on the status information and the target temperature.

In this power management device, the air volume of the fan is controlled based on the status information indicating the status of the power storage system and the target temperature in the housing. The target temperature in the housing is calculated based on the allowable capacity deterioration rate of the storage battery. Since the allowable capacity deterioration rate is set to a value capable of securing the capacity retention in the specified number of cycles, an appropriate target temperature can be obtained from the viewpoint of the capacity retention. As a result, the temperature management in the housing can be improved.

The acquisition unit may include a first acquisition unit that acquires an ambient temperature of the housing as the status information, and a second acquisition unit that acquires a calorific value in the housing as the status information. The ambient temperature of the housing and the calorific value in the housing may affect the temperature in the housing. Therefore, it is possible to further improve the temperature management in the housing by considering the ambient temperature of the housing and the calorific value in the housing.

The power management device may further include a charge/discharge control unit that controls charging and discharging of the storage battery. The calculation unit may further calculate an upper limit depth of charge of the storage battery based on the allowable capacity deterioration rate. The charge/discharge control unit may charge the storage battery at the upper limit depth of charge. The upper limit depth of charge of the storage battery may affect the deterioration rate of the storage capacity. Therefore, for example, by charging the storage battery at the upper limit depth of charge that satisfies the allowable capacity deterioration rate, it is possible to secure the capacity retention in the specified number of cycles.

The storage battery may include a plurality of battery cells. The charge/discharge control unit may charge each of the plurality of battery cells at the upper limit depth of charge. The upper limit depth of charge of the battery cell may affect the deterioration rate of the storage capacity of the battery cell. Therefore, by charging each battery cell at the upper limit depth of charge, it is possible to secure the capacity retention in the specified number of cycles.

The air volume control unit may calculate a required air volume based on the status information and the target temperature, and may control the fan based on the required air volume. For example, the temperature inside the housing can be set to the target temperature by adjusting the air volume of the fan to satisfy the required air volume.

The calculation unit may increase the target temperature within a range satisfying the allowable capacity deterioration rate when the required air volume cannot be obtained by the fan. The higher the target temperature is, the smaller the required air volume is. Therefore, by raising the target temperature, it is possible to increase the possibility of obtaining the required air volume.

A power storage system according to another aspect of the present disclosure includes a power storage device including a storage battery; a housing that houses the power storage device; a fan provided in the housing; and a power management device that controls a temperature in the housing. The power management device controls an air volume of the fan based on a target temperature in the housing calculated based on an allowable capacity deterioration rate of the storage battery and status information indicating a status of the power storage system.

In this power storage system, the air volume of the fan is controlled based on the status information indicating the status of the power storage system and the target temperature in the housing. The target temperature in the housing is calculated based on the allowable capacity deterioration rate of the storage battery. Since the allowable capacity deterioration rate is set to a value capable of securing the capacity retention in the specified number of cycles, an appropriate target temperature can be obtained from the viewpoint of the capacity retention. As a result, the temperature management in the housing can be improved.

Advantageous Effects of Invention

According to each aspect and each embodiment of the present disclosure, it is possible to improve temperature management in a housing.

BRIEF DESCRIPTION OF DRAWINGS

FIG. 6 is a diagram for describing a method of determining the required number of fans.

DESCRIPTION OF EMBODIMENTS

In the following, some embodiments of the present disclosure will be described with reference to the drawings. It should be noted that in the description of the drawings, the same components are designated with the same reference signs, and the redundant description is omitted.

Figure 1:
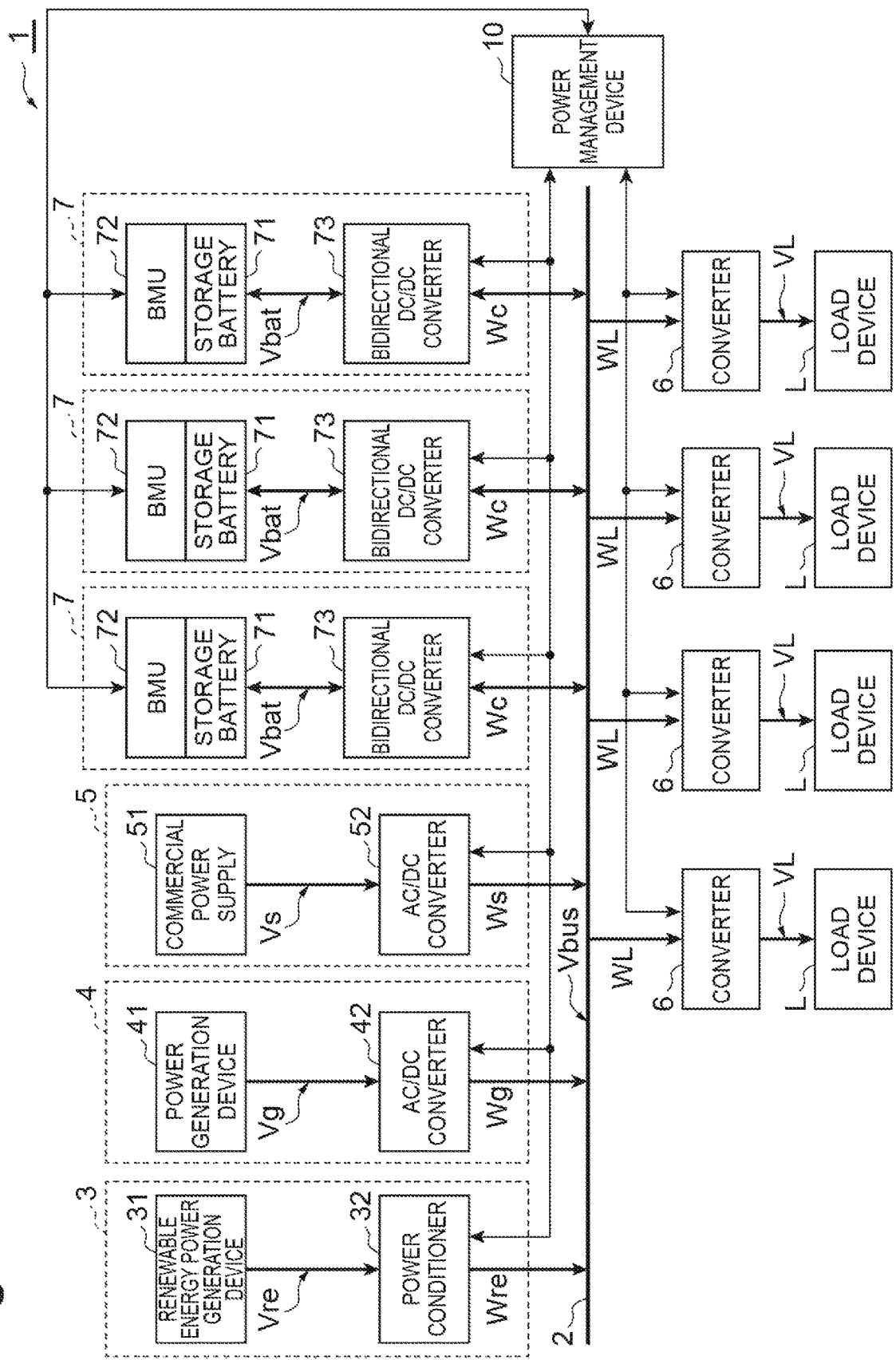
FIG. 1 is a configuration diagram schematically showing a power feeding system including a power storage system according to an embodiment.

FIG. 1 is a configuration diagram schematically showing a power feeding system including a power storage system according to an embodiment. A power feeding system 1 shown in FIG. 1 is a system that supplies load power WL (load voltage VL) to load devices L. In the present embodiment, the power feeding system 1 is a direct current (DC) power feeding system. The load device L may be a DC load device that operates with a DC voltage or an alternating current (AC) load device that operates with an AC voltage. Examples of the DC load devices include a light emission diode (LED) illuminators, DC fans, and personal computers. Examples of AC load devices include washing machines, refrigerators, and air conditioners. The power feeding system 1 includes a DC bus 2, one or more power supply devices 3, one or more auxiliary power supply devices 4, an auxiliary power supply device 5, one or more converters 6, one or more power storage devices 7, and a power management device 10.

The DC bus 2 is a bus that functions as a bus line for performing DC power supply for supplying DC electric power. The DC bus 2 is laid across the installation locations of the power supply device 3, the auxiliary power supply device 4, the auxiliary power supply device 5, the power storage device 7, and the load device L. A bus voltage Vbus is supplied to the DC bus 2. The bus voltage Vbus is a high DC voltage. The bus voltage Vbus is set to be included in the range of the input voltage of the converter 6. The bus voltage Vbus is, for example, a voltage equal to or higher than DC250V and equal to or lower than DC450V. The voltage value of the bus voltage Vbus may be fixed or may vary.

The power supply device 3 is a device that supplies electric power to the DC bus 2. In the present embodiment, the power feeding system 1 includes one power supply device 3. The number of power supply devices 3 is not limited to one, and may be appropriately changed as necessary. The power supply device 3 includes a renewable energy power generation device 31 and a power conditioner 32.

The renewable energy power generation device 31 is a device that generates generated power Wre. Examples of the renewable energy power generation device 31 include a photovoltaic power generation device, a wind power generation device, a hydroelectric power generation device, and a geothermal power generation device. The renewable energy power generation device 31 is connected to the DC bus 2 via the power conditioner 32. The renewable energy power generation device 31 generates a power generation voltage Vre having a predetermined voltage value, and outputs the generated power Wre corresponding to the power generation voltage Vre. The power generation voltage Vre may be a DC voltage or an AC voltage.

The power conditioner 32 is connected to the DC bus 2, and is a device that converts the generated voltage Vre into the bus voltage Vbus. When the power generation voltage Vre is a DC voltage, the power conditioner 32 includes a DC/DC converter. When the power generation voltage Vre is an AC voltage, the power conditioner 32 includes an AC/DC converter. The power conditioner 32 operates with, for example, electric power (DC voltage) supplied from a power supply unit 9 described later. The power conditioner 32 controls the generated power Wre by controlling the power generation operation of the renewable energy power generation device 31 based on a command from the power management device 10. The power conditioner 32 converts the power generation voltage Vre into the bus voltage Vbus based on a command from the power management device 10, and supplies the bus voltage Vbus to the DC bus 2.

The power conditioner 32 has a power measurement function of measuring the generated power Wre supplied from the renewable energy power generation device 31 to the DC bus 2. The power conditioner 32 periodically measures the generated power Wre, for example. The power conditioner 32 transmits the measured value of the generated power Wre to the power management device 10.

The auxiliary power supply device 4 is a device that supplies electric power to the DC bus 2. In the present embodiment, the power feeding system 1 includes one auxiliary power supply device 4. The number of auxiliary power supply devices 4 is not limited to one, and may be appropriately changed as necessary. The auxiliary power supply device 4 includes a power generation device 41 and an AC/DC converter 42.

The power generation device 41 is a device that generates AC generated power Wg. An example of the power generation device 41 is a diesel generator. The power generation device 41 is connected to the DC bus 2 via the AC/DC converter 42. Activation and deactivation of the power generation device 41 are controlled by the power management device 10. For example, the power generation device 41 is activated when a large amount of electric power is temporarily required in order to charge a storage battery 71 described later. In this case, the power generation device 41 is configured to be capable of generating electric power with which the storage battery 71 can be sufficiently charged while supplying the load device L with the load power WL.

In the operating state, the power generation device 41 generates a power generation voltage Vg having a predetermined voltage value, and outputs the generated power Wg corresponding to the power generation voltage Vg. The power generation voltage Vg is an AC voltage.

The AC/DC converter 42 is connected to the DC bus 2, and is a device that converts the power generation voltage Vg into the bus voltage Vbus. The AC/DC converter 42 operates with, for example, electric power (DC voltage) supplied from the power supply unit 9 described later. The AC/DC converter 42 controls the generated power Wg by controlling the power generation operation of the power generation device 41 based on a command from the power management device 10. The AC/DC converter 42 converts the power generation voltage Vg into the bus voltage Vbus based on a command from the power management device 10, and supplies the bus voltage Vbus to the DC bus 2.

The AC/DC converter 42 has a power measurement function of measuring the generated power Wg supplied from the power generation device 41 to the DC bus 2. The AC/DC converter 42 periodically measures the generated power Wg, for example. The AC/DC converter 42 transmits the measured value of the generated power Wg to the power management device 10.

The auxiliary power supply device 5 is a device that supplies electric power to the DC bus 2. The auxiliary power supply device 5 includes a commercial power supply 51 and an AC/DC converter 52. The commercial power supply 51 supplies system power Ws including a system voltage Vs of a predetermined voltage value. The system voltage Vs is an AC voltage. The commercial power supply 51 is connected to the DC bus 2 via the AC/DC converter 52.

The AC/DC converter 52 is connected to the DC bus 2, and is a device that converts the system voltage Vs into the bus voltage Vbus. The system voltage Vs is an AC voltage. The AC/DC converter 52 operates with, for example, electric power (DC voltage) supplied from the power supply unit 9 described later. The AC/DC converter 52 converts the system voltage Vs into the bus voltage Vbus based on a command from the power management device 10, and supplies the bus voltage Vbus to the DC bus 2. The AC/DC converter 52 has a power measurement function of measuring the system power Ws supplied from the commercial power supply 51 to the DC bus 2. The AC/DC converter 52 periodically measures the system power Ws, for example. The AC/DC converter 52 transmits the measured value of the system power Ws to the power management device 10.

Since the auxiliary power supply device 4 and the auxiliary power supply device 5 can stably supply electric power, they are controlled so as to supply electric power when the electric power of the entire power feeding system 1 is insufficient.

The converter 6 is connected to the DC bus 2, and is a device that converts the bus voltage Vbus into a load voltage VL. The load voltage VL is a voltage supplied to the load device L. The load device L is connected to the DC bus 2 via the converter 6. The converter 6 operates with, for example, electric power (DC voltage) supplied from the power supply unit 9 described later. In the present embodiment, the power feeding system 1 includes four converters 6. The number of converters 6 is not limited to four, and may be changed in accordance with the number of load devices L.

When receiving a start command from the power management device 10, the converter 6 converts the bus voltage Vbus into the load voltage VL, and supplies the load voltage VL (load power WL) to the load device L. When the load device L is a DC load device, the load voltage VL is a DC voltage, and the converter 6 is a DC/DC converter. When the load device L is an AC load device, the load voltage VL is an AC voltage, and the converter 6 is a DC/AC converter. When receiving a stop command from the power management device 10, the converter 6 stops supplying the load voltage VL.

The converter 6 has a current limiting function of limiting a load current supplied from the DC bus 2 to the load device L to an upper limit current value. The upper limit current value is set by the power management device 10. The converter 6 has a power measurement function of measuring the load power WL supplied from the DC bus 2 to the load device L based on the load voltage VL and the load current. The converter 6 periodically measures the load power WL, for example. The converter 6 transmits the measured value of the load power WL to the power management device 10.

The power storage device 7 is a device for storing surplus electric power generated in the power feeding system 1 and supplying deficient electric power generated in the power feeding system 1. When the difference power obtained by subtracting the sum of the load power WL from the sum of the supply power is larger than 0, surplus electric power equal to the magnitude (power value) of the difference power occurs. The supply power is electric power supplied to the DC bus 2. In the present embodiment, the supply power is the generated power Wre, the generated power Wg, and the system power Ws. Power Wc obtained by equally dividing surplus electric power by the number of power storage devices 7 is supplied from the DC bus 2 to each power storage device 7. When the difference power is less than 0, deficient electric power equal to the magnitude of the difference power occurs. From each power storage device 7, power Wc obtained by equally dividing the deficient electric power by the number of power storage devices 7 is released to the DC bus 2.

In the present embodiment, the power feeding system 1 includes three power storage devices 7. The number of power storage devices 7 is not limited to three, and may be appropriately changed as necessary. Each of the power storage devices 7 includes the storage battery 71, a battery management unit (BMU) 72, and the bidirectional DC/DC converter 73 (second converter).

The storage battery 71 is a chargeable and dischargeable device. The storage battery 71 is connected to the DC bus 2 via the bidirectional DC/DC converter 73. Examples of the storage battery 71 include a lithium ion battery, a sodium-sulfur (NAS) battery, a redox flow battery, a lead acid battery, and a nickel metal hydride battery. In the present embodiment, the storage batteries 71 included in the power storage devices 7 are of the same type and have the same storage capacity. The storage capacity is the maximum amount of electric power that can be stored. The storage batteries 71 included in the power storage devices 7 may be different types of storage batteries and may have different storage capacities. The storage battery 71 includes, for example, a plurality of battery cells.

The BMU 72 is a device that manages the storage battery 71. The BMU 72 has a function of measuring a battery voltage Vbat of the storage battery 71, and a function of calculating a state of charge (SOC) by measuring the current value of the charging and discharging current of the storage battery 71. The BMU 72 may further have a function of measuring cell voltages of the battery cells constituting the storage battery 71. The BMU 72 may further have a function of measuring the number of charge/discharge cycles performed on the storage battery 71 and the present storage capacity of the storage battery 71. The BMU 72 transmits the battery information of the storage battery 71 to the power management device 10. The battery information includes the measured value of the battery voltage Vbat, the current value of the charging and discharging current, and the SOC. The battery information may include the number of charge/discharge cycles that have been performed and the present storage capacity. The battery information may include the temperature of the storage battery 71. The BMU 72 periodically transmits the battery information to the power management device 10.

The bidirectional DC/DC converter 73 is connected to the DC bus 2, and is a device capable of bidirectionally converting between the bus voltage Vbus and the battery voltage Vbat. The bidirectional DC/DC converter 73 is provided between the storage battery 71 and the DC bus 2. The battery voltage Vbat is the voltage of the storage battery 71. As the bidirectional DC/DC converter 73, a known bidirectional DC/DC converter can be used. The bidirectional DC/DC converter 73 operates with, for example, electric power (DC voltage) supplied from the power supply unit 9 described later.

The bidirectional DC/DC converter 73 is controlled by the power management device 10. Specifically, when the bidirectional DC/DC converter 73 receives a charge command from the power management device 10, the bidirectional DC/DC converter 73 converts the bus voltage Vbus into the battery voltage Vbat and causes a charging current to flow from the DC bus 2 to the storage battery 71. Thus, the storage battery 71 is charged. When the bidirectional DC/DC converter 73 receives a discharge command from the power management device 10, the bidirectional DC/DC converter 73 converts the battery voltage Vbat into the bus voltage Vbus and causes a discharging current to flow from the storage battery 71 to the DC bus 2. Thus, the storage battery 71 is discharged. The bidirectional DC/DC converter 73 may charge or discharge the storage battery 71 in a constant-current manner or in a constant-voltage manner.

When the bidirectional DC/DC converter 73 receives a stop command from the power management device 10, the bidirectional DC/DC converter 73 stops the operation and shifts to a sleep state in which the electric power consumption is reduced. When the bidirectional DC/DC converter 73 receives the charge command or the discharge command in the sleep state, the bidirectional DC/DC converter 73 exits from the sleep state and executes the charge process or the discharge process. The bidirectional DC/DC converter 73 has a current limiting function of limiting each current value of the charging current supplied to the storage battery 71 and the discharging current discharged from the storage battery 71 to a maximum current value (for example, 45 A) of the storage battery 71 or less.

The bidirectional DC/DC converter 73 has a power measurement function of measuring the power Wc. The bidirectional DC/DC converter 73 periodically measures the power Wc, for example. The bidirectional DC/DC converter 73 transmits the measured value of the power Wc to the power management device 10.

The power management device 10 is a device (controller) that manages the entire power feeding system 1. The power management device 10 is also referred to as an energy management system (EMS). The power management device 10 is communicably connected to the power supply device 3, the auxiliary power supply device 4, the auxiliary power supply device 5, the converter 6, and the power storage device 7 via a communication line. The communication line may be configured to be wired or wireless. The power management device 10 may perform communication conforming to standards such as RS-232C, RS-485, Controller Area Network (CAN), and Ethernet (registered trademark).

The power management device 10 performs a voltage measurement process of measuring the bus voltage Vbus. The power management device 10 may directly measure the bus voltage Vbus. The power management device 10 may indirectly measure the bus voltage Vbus by the bidirectional DC/DC converter 73 measuring the bus voltage Vbus and transmitting the measured value to the power management device 10.

The power management device 10 transmits a start command and a stop command to each of the power conditioner 32, the AC/DC converter 42, the AC/DC converter 52, the converter 6, and the bidirectional DC/DC converter 73. For example, the power management device 10 causes the converter 6 to supply the load voltage VL by transmitting a start command to the converter 6. The power management device 10 causes the converter 6 to stop supplying the load voltage VL by transmitting a stop command to the converter 6. The same applies to the other converters.

The power management device 10 performs a charge and discharge process of charging and discharging the storage battery 71 by controlling the bidirectional DC/DC converter 73. The power management device 10 performs the charge and discharge process depending on the difference power. When the sum of the supply power is larger than the sum of the load power WL (when the difference power is larger than 0), the power management device 10 transmits the charge command to the bidirectional DC/DC converter 73 and causes the storage battery 71 to store surplus electric power that is the difference power. That is, electric power obtained by equally dividing the surplus electric power by the number of storage batteries 71 is stored in each storage battery 71. When the sum of the supply power is smaller than the sum of the load power WL (when the difference power is smaller than 0), the power management device 10 transmits the discharge command to the bidirectional DC/DC converter 73 and causes the storage battery 71 to discharge the deficient electric power. Electric power obtained by equally dividing the deficient electric power by the number of storage batteries 71 is discharged from each storage battery 71.

The power management device 10 acquires the temperature in a rack 20 of a power storage system 100 described later from a temperature sensor (not illustrated) and controls the temperature in the rack 20. Details of the temperature control in the rack 20 will be described later.

Figure 2:
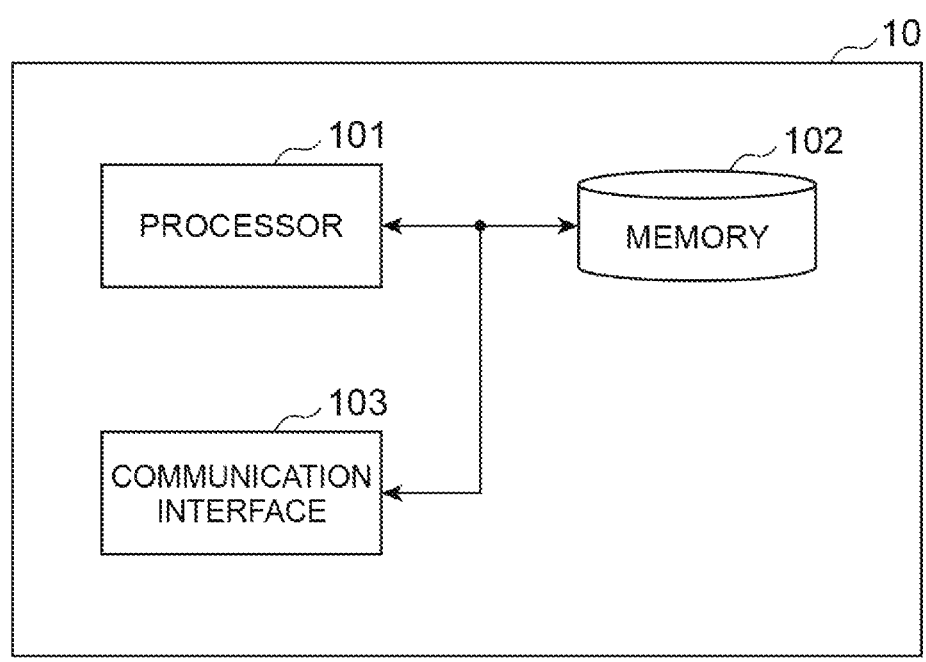
FIG. 2 is a hardware configuration diagram of the power management device shown in FIG. 1.

FIG. 2 is a hardware configuration diagram of the power management device shown in FIG. 1. As shown in FIG. 2, the power management device 10 may be physically configured as a computer including hardware such as one or more processors 101, a memory 102, and a communication interface 103. An example of the processor 101 is a central processing unit (CPU). The memory 102 may include a main storage device and an auxiliary storage device. The main storage device is constituted by a random access memory (RAM), a read only memory (ROM), and the like. Examples of the auxiliary storage device include a semiconductor memory and a hard disk device. The communication interface 103 is a device that transmits/receives data to/from other devices. The communication interface 103 includes, for example, a communication module conforming to a communication standard such as RS-232C, RS-485, or CAN, a network interface card (NIC), or a wireless communication module.

Figure 4:
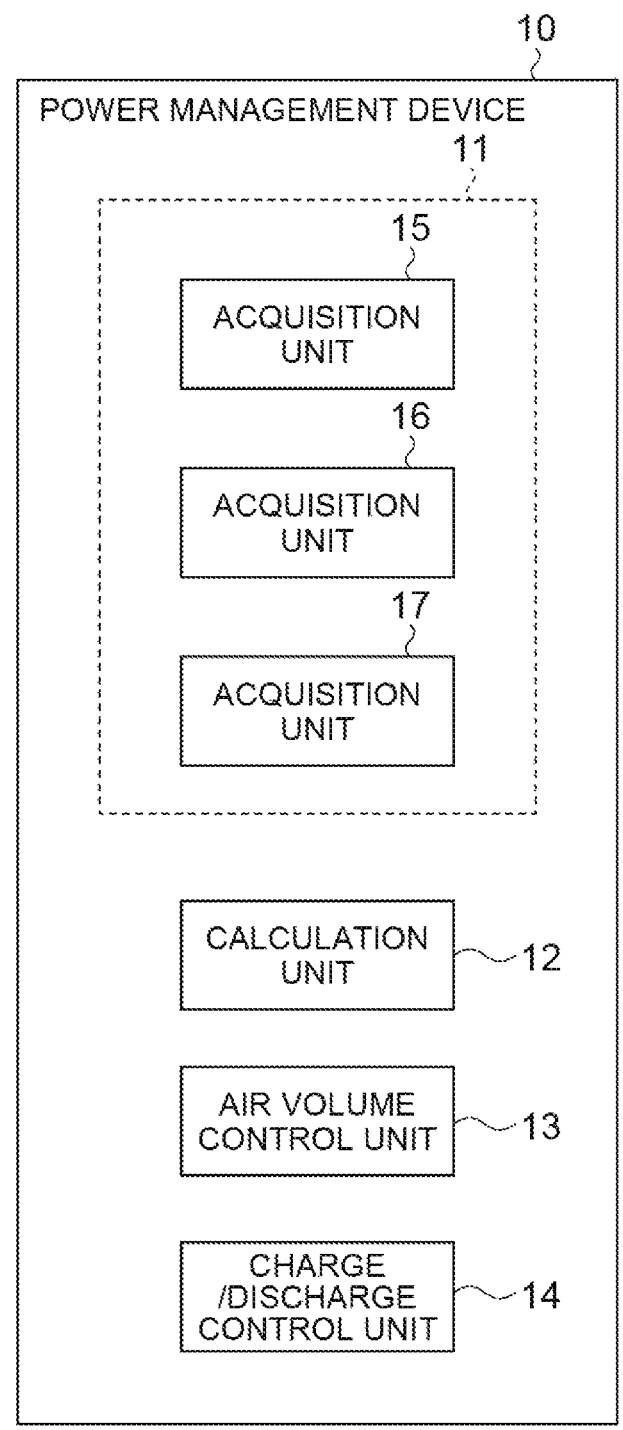
FIG. 4 is a functional block diagram of the power management device shown in FIG. 1.

By the processor 101 reading a program stored in the memory 102 to execute the program, each hardware operates under the control of the processor 101 to read and write data from/to the memory 102. Thus, the functional units of the power management device 10 shown in FIG. 4 are implemented.

Figure 3:
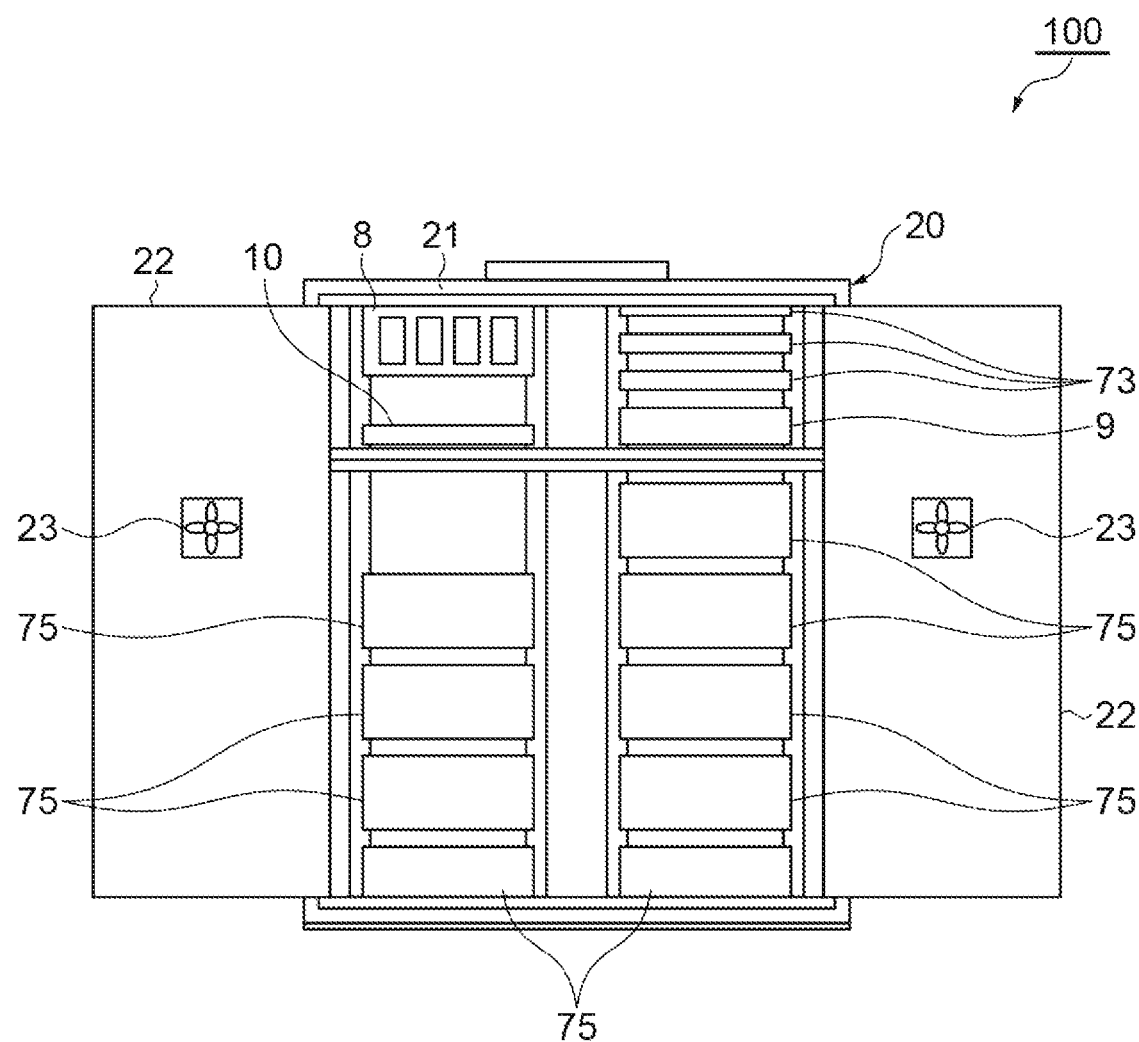
FIG. 3 is a front view schematically showing the power storage system including the power storage device shown in FIG. 1.

Next, a power storage system including the power storage device 7 will be described. FIG. 3 is a front view schematically showing a power storage system including the power storage device shown in FIG. 1. The power storage system 100 illustrated in FIG. 3 is a rack-type system that houses the power storage device 7. The power storage system 100 includes the power storage device 7, a breaker 8, the power supply unit 9, the power management device 10, and the rack 20.

The breaker 8 is a device for interrupting the electrical connection between each converter and the DC bus 2. Examples of converters interrupted by the breaker 8 include the bidirectional DC/DC converter 73, the power conditioner 32, the AC/DC converter 42, and the AC/DC converter 52. The breaker 8 switches a connection state between each converter and the DC bus 2 between a conduction state and a cutoff state.

For example, during maintenance of the bidirectional DC/DC converter 73, the breaker 8 electrically disconnects the bidirectional DC/DC converter 73 from the DC bus 2. Similarly, during maintenance of the solar panel of the renewable energy power generation device 31, the breaker 8 electrically disconnects the power conditioner 32 from the DC bus 2. In order to protect the power feeding system 1, the breaker 8 electrically disconnects the converter from the DC bus 2 when an abnormality such as an unexpected overcurrent or overvoltage occurs in the converter.

The power supply unit 9 is a device for supplying electric power to each device in the power storage system 100. The power supply unit 9 generates a DC voltage having a constant voltage value from the bus voltage Vbus of the DC bus 2, and supplies the DC voltage (electric power) to each device. The voltage value of the DC voltage generated by the power supply unit 9 is, for example, 12V or 24V.

The rack 20 is a sealable housing. The rack 20 is, for example, a 19-inch rack. The rack 20 houses, for example, the power storage device 7, the breaker 8, the power supply unit 9, and the power management device 10. The breaker 8, the power supply unit 9, the power management device 10, and the bidirectional DC/DC converters 73 are housed in the upper stage of the rack 20. The battery units 75 in which the storage battery 71 and the BMU 72 are integrated are housed in the lower stage of the rack 20.

Although the number of battery units 75 is larger than the number of bidirectional DC/DC converters 73, in this example, three battery units 75 are provided for one bidirectional DC/DC converter 73. At least one of the power conditioner 32, the AC/DC converter 42, and the AC/DC converter 52 may be further housed in the rack 20. The rack 20 includes a main body portion 21, a door portion 22, and a fan 23.

The main body 21 is a box-shaped member having openings on the front surface and the rear surface. The door portion 22 is a member that closes the opening of the main body portion 21. In the present embodiment, two left and right door portions 22 are provided on each of the front surface and the rear surface of the main body portion 21.

The fan 23 includes an intake fan that takes in air from the outside to the inside of the rack 20, and an exhaust fan that discharges air from the inside to the outside of the rack 20. The fan 23 is provided in the rack 20. In the present embodiment, four fans 23 (two intake fans and two exhaust fans) are provided in the rack 20. The number of fans 23 is not limited to four, and may be appropriately changed as necessary. The intake fan is attached to, for example, the door 22 on the front surface. The exhaust fan is attached to, for example, the door portion 22 on the rear surface. The fan 23 may be attached to a side surface of the main body 21. The air volume (the number of operating fans) of the fan 23 is controlled by the power management device 10.

Next, functional units of the power management device 10 for performing temperature control in the rack 20 will be described. FIG. 4 is a functional block diagram of the power management device shown in FIG. 1. As shown in FIG. 4, the power management device 10 functionally includes an acquisition unit 11, a calculation unit 12, an air volume control unit 13, and a charge/discharge control unit 14.

The acquisition unit 11 is a functional unit that acquires status information indicating the status of the power storage system 100. Examples of the status information include the ambient temperature of the rack 20 and the calorific value (amount of heat generated) in the rack 20. The acquisition unit 11 includes an acquisition unit 15 (first acquisition unit), an acquisition unit 16 (second acquisition unit), and an acquisition unit 17.

The acquisition unit 15 is a functional unit that acquires the ambient temperature of the rack 20 as status information. The acquisition unit 15 acquires, for example, a temperature detected by a temperature sensor (not illustrated) provided outside the rack 20 as an ambient temperature. The temperature sensor is attached to a place that is not affected by exhaust heat from the rack 20 and other devices. The temperature sensor is attached to, for example, the outside of the intake fan of the rack 20, the bottom of the side surface of the main body 21, or a wall surface having a height of about 1000 mm.

The acquisition unit 16 is a functional unit that acquires the calorific value in the rack 20 as status information. The acquisition unit 16 acquires, for example, a measured value of the power Wc between the DC bus 2 and the bidirectional DC/DC converter 73 from each bidirectional DC/DC converter 73, and calculates the calorific value in the bidirectional DC/DC converter 73 based on the measured value of the power Wc and the conversion efficiency of the bidirectional DC/DC converter 73. Specifically, the acquisition unit 16 calculates the calorific value by multiplying the measured value of the power Wc by the conversion efficiency and subtracting the multiplication result from the measured value of the power Wc.

For example, when the measured value of the power Wc is 2500 W and the conversion efficiency of the bidirectional DC/DC converter 73 is 90%, 2500 W×(100−90%)=250 W is calculated as the calorific value. When the measured value of the electric power Wc is 500 W and the conversion efficiency of the bidirectional DC/DC converter 73 is 85%, 500 W×(100−85%)=75 W is calculated as the calorific value.

When the power conditioner 32, the AC/DC converter 42, and the AC/DC converter 52 are housed in the rack 20, the acquisition unit 16 calculates the calorific value in each converter in the same manner as the bidirectional DC/DC converter 73. The acquisition unit 16 acquires the sum of the calorific values in the devices housed in the rack 20 as the calorific value in the rack 20.

The acquisition unit 17 is a functional unit that acquires the temperature inside the rack 20 (internal temperature) as status information. The acquisition unit 17 acquires, for example, a temperature detected by a temperature sensor (not illustrated) provided inside the rack 20 as an internal temperature. The temperature sensor is attached to, for example, the vicinity of the exhaust fan in the rack 20 or the upper surface of the storage battery 71. The acquisition unit 17 may acquire the temperature included in the battery information received from the BMU 72 as the internal temperature.

The calculation unit 12 is a functional unit that calculates the target temperature in the rack 20 and the upper limit depth of charge of the storage battery 71 based on the allowable capacity deterioration rate of the storage battery 71. The allowable capacity deterioration rate is a maximum deterioration rate (decrease rate) of the storage capacity allowable per one cycle of charge and discharge. The allowable capacity deterioration rate is set to a value capable of maintaining the capacity retention in a specified number of cycles (for example, 5000 cycles) at a predetermined target value or more.

One cycle of charge and discharge means a series of flows from the start of one charge process to the end of one discharge process. The capacity deterioration rate Lc (unit: %) per cycle is expressed by Formula (1) using the storage capacity $Cs_n$ after n cycles and the storage capacity $Cs_{n+1}$ after (n+1) cycles. For example, in the case where the storage capacity $Cs_n$ is 100 Ah and the storage capacity $Cs_{n+1}$ is 99. 99 Ah, it is 0.01%.

[Formula 1]

$$Lc = \left(1 - \frac{Cs_{n+1}}{Cs_n}\right) \times 100 \qquad (1)$$

The upper limit depth of charge is an upper limit value of the depth of charge. The depth of charge is an index indicating the degree of charge. As the depth of charge, the ratio of the amount of stored electric power to the storage capacity is used. For example, the depth of charge when the storage battery 71 is fully charged is assumed to be 1 (100%), and the depth of charge when the storage battery 71 is at the end of discharge is assumed to be 0 (0%).

Figure 5:
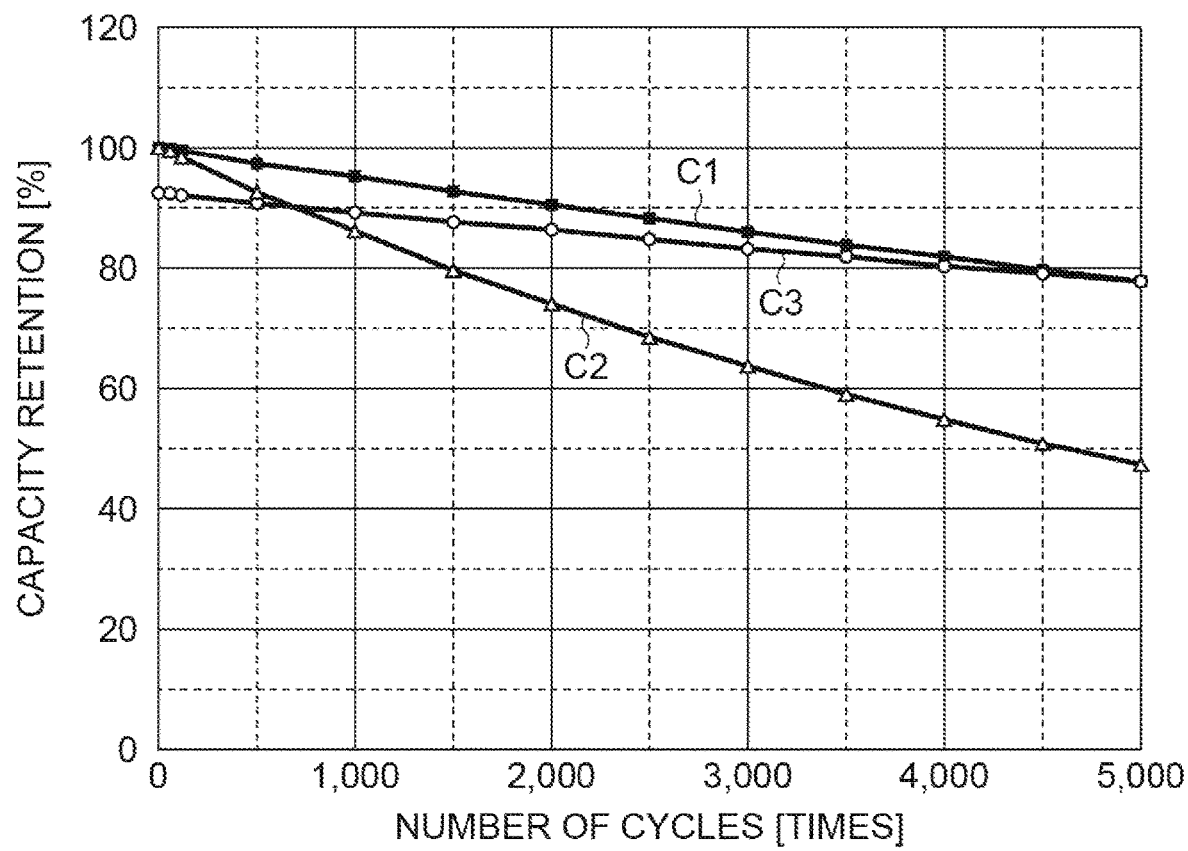
FIG. 5 is a diagram showing an example of cycle characteristics of the storage battery shown in FIG. 1.

Here, the cycle characteristics of the storage battery 71 will be described with reference to FIG. 5. FIG. 5 is a diagram showing an example of cycle characteristics of the storage battery shown in FIG. 1. The cycle characteristics are characteristics indicating a relationship between the number of charge and discharge cycles and a capacity retention. The horizontal axis in FIG. 5 represents the number of charge/discharge cycles (unit: times). The vertical axis in FIG. 5 represents the capacity retention (unit: %). The capacity retention is the ratio of the amount of stored electric power to the initial storage capacity. The capacity retention is obtained, for example, by dividing the amount of stored electric power by the initial storage capacity.

The characteristic C1 is a cycle characteristic in a case where the storage battery 71 is used at room temperature (25 degrees C.) and the storage battery 71 is charged with a depth of charge of 100%. The characteristic C2 is a cycle characteristic in a case where the storage battery 71 is used at a high temperature and the storage battery 71 is charged with a depth of charge of 100%. The characteristic C3 is a cycle characteristic in a case where the storage battery 71 is used at room temperature (25 degrees C.) and the storage battery 71 is charged at a depth of charge of 92%. As shown in FIG. 5, when the storage battery 71 is used at a high temperature, the deterioration rate of the storage capacity per one cycle of charge and discharge is large, and the capacity retention decreases to about 47% after 5000 cycles. On the other hand, when the storage battery 71 is charged at a low depth of charge, the deterioration rate of the storage capacity per one cycle of charge and discharge is small. Therefore, although the initial amount of stored electric power is small, the capacity retention after 5000 cycles is about 78%.

Next, a method of calculating the target temperature and the upper limit depth of charge will be described. First, the calculation unit 12 calculates the number of cycles that have been performed and the present storage capacity of the storage battery 71 from the use history of the storage battery 71. Then, the calculation unit 12 sets the allowable capacity deterioration rate to a value at which the capacity retention in the specified number of cycles (for example, 5000 cycles) can be maintained to be equal to or greater than the predetermined target value based on the number of cycles that have been performed and the present storage capacity of the storage battery 71. The target value of the capacity retention at the specified number of cycles (target capacity retention) is set in advance.

For example, the calculation unit 12 subtracts the number of cycles that have been performed from the specified number of cycles to obtain the remaining number of cycles. The calculation unit 12 calculates, as the allowable capacity deterioration rate, the minimum capacity deterioration rate among the capacity deterioration rates at which the capacity retention is equal to or higher than the target capacity retention on the assumption that the storage capacity decreases at a predetermined capacity deterioration rate for each cycle of the number of remaining cycles. In a case where the storage capacity of the storage battery 71 has significantly decreased due to previous use, the allowable capacity deterioration rate is set to a small value. On the other hand, when the storage capacity of the storage battery 71 has not decreased so much due to the previous use, the allowable capacity deterioration rate is set to a large value.

The calculation unit 12 may set the allowable capacity deterioration rate to a fixed value regardless of the deterioration of the storage capacity. In a case where the storage capacities of the plurality of storage batteries 71 are different, the user may set the allowable capacity deterioration rate. When the lifetime is prioritized, the calculation unit 12 may set the allowable capacity deterioration rate on the basis of the storage battery 71 having the poorest performance (that is, the smallest storage capacity). When electric power is prioritized, the calculation unit 12 may set the allowable capacity deterioration rate on the basis of the average value of the storage capacities of the plurality of storage batteries 71.

As shown in Formula (2), the calculation unit 12 calculates the target temperature T and the upper limit depth of charge UV such that the calculated allowable capacity deterioration rate Ls is equal to or lower than the allowable capacity deterioration rate La, for example. Here, the eigenvalue A is a deterioration rate of the storage capacity per cycle in a case where the storage battery 71 is used at 25 degrees C. of the temperature in the rack 20. The eigenvalue A is an eigenvalue derived from the characteristics of the storage battery 71.

[Formula 2]

$$A \times \frac{T-15}{10} \times UV = Ls \leq La \qquad (2)$$

When receiving the recalculation command of the target temperature from the air volume control unit 13, the calculation unit 12 recalculates the target temperature T and the upper limit depth of charge UV such that the calculated allowable capacity deterioration rate Ls becomes equal to or lower than the allowable capacity deterioration rate La. Specifically, the calculation unit 12 increases the target temperature T in a range in which the calculated allowable capacity deterioration rate Ls is equal to or lower than the allowable capacity deterioration rate La.

The air volume control unit 13 is a functional unit that controls the air volume of the fan 23 based on the status information and the target temperature. The air volume control unit 13 calculates a required air volume based on the status information and the target temperature, and controls the fan based on the required air volume. The air volume control unit 13 calculates the required air volume using, for example, a calculation formula including the calorific value, the ambient temperature, and the target temperature as variables.

As shown in FIG. 6, the required air volume increases as the calorific value increases, and the required air volume decreases as the calorific value decreases. The higher the ambient temperature is, the larger the required air volume becomes, and the lower the ambient temperature is, the smaller the required air volume becomes. The higher the target temperature is, the smaller the required air volume becomes, and the lower the target temperature is, the larger the required air volume becomes. The calorific value shown in FIG. 6 is a value normalized by the maximum value. The required air volume may also vary depending on the dimensions of the rack 20, the effective area of the rack 20, the material (thermal conductivity) of the rack 20, the thickness of each part (the main body 21 and the door 22) constituting the rack 20, the specific gravity of air, the constant-pressure specific heat of air, the thermal conductivity, and the like. However, since these values are fixed values, they are included in the above calculation formula as fixed values.

For example, the air volume control unit 13 determines the number (required number) of fans 23 required to obtain the required air volume, and operates the fans 23 by transmitting an operation command to the required number of fans 23. When the required number is one, the air volume control unit 13 transmits an operation command to, for example, one exhaust fan among the four fans 23. When the required number is two, the air volume control unit 13 transmits an operation command to, for example, one intake fan and one exhaust fan among the four fans 23. When the required number is three, the air volume control unit 13 transmits an operation command to, for example, one intake fan and two exhaust fans among the four fans 23. When the required number is four, the air volume control unit 13 transmits an operation command to the four fans 23.

In the example shown in FIG. 6, the required number of fans 23 is determined on the assumption that the air volume per fan 23 is 2.2 m$^3$/min. When the required air volume cannot be obtained even if all the fans 23 included in the power storage system 100 are operated, the air volume control unit 13 outputs a recalculation command of the target temperature to the calculation unit 12 in order to increase the target temperature.

When the internal temperature in the rack 20 is higher than the target temperature, the air volume control unit 13 operates all the fans 23 by transmitting an operation command to all the fans 23. When the internal temperature in the rack 20 is lower than the target temperature by a predetermined temperature (for example, 10 degrees C.) or more, the air volume control unit 13 stops all the fans 23 by transmitting a stop command to the fans 23 in operation.

The charge/discharge control unit 14 is a functional unit that controls charging and discharging of the storage battery 71. The charge/discharge control unit 14 charges the storage battery 71 at the upper limit depth of charge. Specifically, the charge/discharge control unit 14 transmits a charge command including the upper limit depth of charge to the bidirectional DC/DC converter 73, and the bidirectional DC/DC converter 73 charges the storage battery 71 at a depth of charge equal to or less than the upper limit depth of charge. The charge/discharge control unit 14 may charge each of the battery cells included in the storage battery 71 at the upper limit depth of charge. Specifically, the charge/discharge control unit 14 transmits a charge command including the upper limit depth of charge to the bidirectional DC/DC converter 73, and the bidirectional DC/DC converter 73 charges each battery cell at a depth of charge equal to or less than the upper limit depth of charge.

Figure 7:
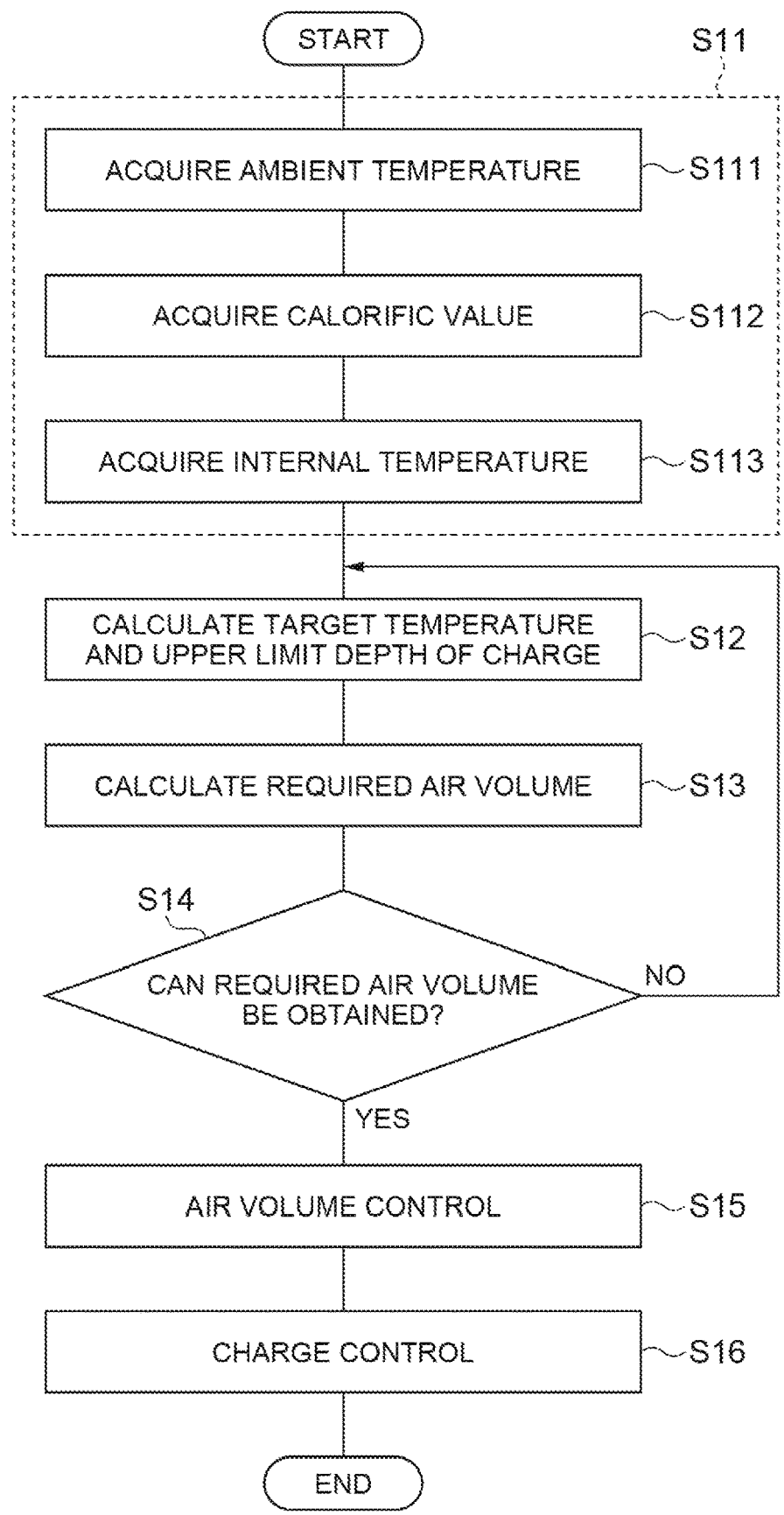
FIG. 7 is a flowchart showing a series of processes of a temperature control method performed by the power management device shown in FIG. 1.

Next, a method of controlling the temperature in the rack 20 performed by the power management device 10 will be described with further reference to FIG. 7. FIG. 7 is a flowchart showing a series of processes of a temperature control method performed by the power management device shown in FIG. 1. The series of processes in FIG. 7 is repeatedly performed for each cycle of charge and discharge.

First, the acquisition unit 11 acquires status information (step S11). To be more specific, the acquisition unit 15 acquires the ambient temperature of the rack 20 as the status information (step S111). The acquisition unit 15 acquires, for example, a temperature detected by a temperature sensor (not illustrated) provided outside the rack 20 as the ambient temperature. Then, the acquisition unit 15 outputs the ambient temperature to the air volume control unit 13.

Further, the acquisition unit 16 acquires the calorific value in the rack 20 as the status information (step S112). For example, the acquisition unit 16 acquires the sum of the calorific values in the devices housed in the rack 20 as the calorific value in the rack 20. Then, the acquisition unit 16 outputs the calorific value to the air volume control unit 13.

Further, the acquisition unit 17 acquires the internal temperature of the rack 20 as the status information (step S113). The acquisition unit 17 acquires, for example, a temperature detected by a temperature sensor (not illustrated) provided inside the rack 20 as the internal temperature. Then, the acquisition unit 17 outputs the internal temperature to the air volume control unit 13.

Subsequently, the calculation unit 12 calculates the target temperature in the rack 20 and the upper limit depth of charge of the storage battery 71 (step S12). In step S12, first, the calculation unit 12 calculates the number of cycles that have been performed and the present storage capacity of the storage battery 71 from the use history of the storage battery 71. Then, the calculation unit 12 sets the allowable capacity deterioration rate to a value capable of maintaining the capacity retention at the specified number of cycles to be equal to or higher than a predetermined target value (target capacity retention) based on the number of cycles that have been performed and the present storage capacity of the storage battery 71. Then, the calculation unit 12 calculates the target temperature T and the upper limit depth of charge UV using the above-described Formula (2) such that the calculated allowable capacity deterioration rate Ls is equal to or less than the allowable capacity deterioration rate La. Then, the calculation unit 12 outputs the target temperature to the air volume control unit 13 and outputs the upper limit depth of charge to the charge/discharge control unit 14.

Subsequently, when the air volume control unit 13 receives the ambient temperature from the acquisition unit 15, the calorific value from the acquisition unit 16, and the target temperature from the calculation unit 12, the air volume control unit 13 calculates the required air volume based on the calorific value, the ambient temperature, and the target temperature (step S13). For example, the air volume control unit 13 calculates the required air volume by using a calculation formula including the calorific value, the ambient temperature, and the target temperature as variables.

Then, the air volume control unit 13 determines whether or not the required air volume can be obtained (step S14). The air volume control unit 13 determines the number (required number) of fans 23 required to obtain the required air volume. If the required number is larger than the total number of fans 23 included in the power storage system 100, the air volume control unit 13 determines that the required air volume cannot be obtained (step S14; NO) and outputs a recalculation command of the target temperature to the calculation unit 12. Then, the calculation unit 12 recalculates the target temperature and the upper limit depth of charge within a range satisfying Formula (2) (step S12). At this time, the calculation unit 12 calculates a target temperature higher than the previously calculated target temperature. Then, the processes of step S13 and step S14 are performed.

In step S14, when the required number is equal to or less than the total number of fans 23 included in the power storage system 100, the air volume control unit 13 determines that the required air volume can be obtained (step S14; YES), and performs the air volume control of the fans 23 (step S15). In step S15, the air volume control unit 13 operates the fans 23 by transmitting an operation command to the required number of fans 23. In step S15, when the internal temperature of the rack 20 is higher than the target temperature, the air volume control unit 13 operates all the fans 23. When the internal temperature in the rack 20 is lower than the target temperature by a predetermined temperature (here, 10 degrees C.) or more, the air volume control unit 13 stops all the fans 23 by transmitting a stop command to the fans 23 in operation.

Subsequently, upon receiving the upper limit depth of charge from the calculation unit 12, the charge/discharge control unit 14 performs charge control of the storage battery 71 (step S16). In step S16, the charge/discharge control unit 14 transmits a charge command including the upper limit depth of charge to the bidirectional DC/DC converter 73. Upon receiving the charge command, the bidirectional DC/DC converter 73 charges the storage battery 71 at a depth of charge equal to or lower than the upper limit depth of charge.

Thus, a series of processes of the temperature control method in the rack 20 is completed. As described above, the power management device 10 controls the air volumes of the fans 23 based on the target temperature in the rack 20 calculated based on the allowable capacity deterioration rate of the storage battery 71 and the status information indicating the status of the power storage system 100. The power management device 10 performs charge control of the storage battery 71 based on the upper limit depth of charge calculated based on the allowable capacity deterioration rate of the storage battery 71.

Steps S111 to S113 may be performed in an arbitrary order. Each step of steps S111 to S113 may be performed in parallel with other steps. Step S11 may be performed after step S12, or may be performed in parallel with step S12. Step S16 may be performed before step S15, or may be performed in parallel with step S15.

Hereinafter, the content of the present disclosure will be specifically described using Examples and Comparative Examples, but the present disclosure is not limited to the following Examples.

In each of Examples 1 to 5 and Comparative Examples 1 and 2, the power storage system 100 shown in FIG. 2 was used. As the temperature control, the temperature control method shown in FIG. 7 was used in Examples 1 to 5, all (four) fans were constantly operated in Comparative Example 1, and the operation of all fans was stopped when the temperature in the rack was lower than the target temperature by 2 degrees C. in Comparative Example 2. The values of ambient temperature, calorific value, and the like used in Examples 1 to 5 and Comparative Examples 1 and 2 are as follows.

EXAMPLE 1

The ambient temperature was 37 degrees C., and the calorific value (value normalized by the maximum value) was 1. The allowable capacity deterioration rate was set to 0.0150%, the target temperature was set to 44 degrees C., and the upper limit depth of charge of the storage battery 71 was set to 1 (100%).

EXAMPLE 2

The ambient temperature was 37 degrees C., and the calorific value (value normalized by the maximum value) was 0.6. The allowable capacity deterioration rate was set to 0.0150%, the target temperature was set to 44 degrees C., and the upper limit depth of charge of the storage battery 71 was set to 1 (100%).

EXAMPLE 3

The ambient temperature was 37 degrees C., and the calorific value (value normalized by the maximum value) was 1. The allowable capacity deterioration rate was set to 0.0160%, the target temperature was set to 45 degrees C., and the upper limit depth of charge of the storage battery 71 was set to 1 (100%).

EXAMPLE 4

The ambient temperature was 37 degrees C., and the calorific value (value normalized by the maximum value) was 1. The allowable capacity deterioration rate was set to 0.0160%, the target temperature was set to 49 degrees C., and the upper limit depth of charge of the storage battery 71 was set to 0.9 (90%).

EXAMPLE 5

The ambient temperature was 37 degrees C., and the calorific value (value normalized by the maximum value) was 1. The allowable capacity deterioration rate was set to 0.0160%, the target temperature was set to 49 degrees C., and the upper limit depth of charge of the battery cell was set to 0.9 (90%).

COMPARATIVE EXAMPLE 1

The ambient temperature was 37 degrees C., the calorific value (value normalized by the maximum value) was 1, and the target temperature was set to 44 degrees C.

COMPARATIVE EXAMPLE 2

The ambient temperature was 37 degrees C., the calorific value (value normalized by the maximum value) was 1, and the target temperature was set to 44 degrees C.

Under each condition, 100 cycles of charge and discharge were performed, and the capacity deterioration rate $Lc_{100}$ after 100 cycles was calculated. The capacity deterioration rate $Lc_{100}$ is calculated by Formula (3) using the initial storage capacity $Cs_0$ and the storage capacity $Cs_{100}$ after 100 cycles.

[Formula 3]

$$Lc_{100} = \left(1 - \frac{Cs_{100}}{Cs_0}\right) \times 100 \quad (3)$$

Further, the storage capacity after 1000 cycles was estimated from the capacity deterioration rate $Lc_{100}$ after 100 cycles, and the capacity retention after 1000 cycles is calculated by dividing the storage capacity after 1000 cycles by the initial storage capacity. For example, when the initial storage capacity $Cs_0$ is 100 Ah and the capacity deterioration rate $Lc_{100}$ is 5%, the capacity deterioration rate per cycle is $\{1-(0.95)^{1/100}\}=0.00513\%$. Therefore, the storage capacity after 1000 cycles is 100 Ah$\times(100-0.00513)^{1000}$=59.9 Ah, and the capacity retention after 1000 cycles is (59.9 Ah/100 Ah)$\times$100=59.9%.

TABLE 1

| | AMBIENT TEMPERATURE | CALORIFIC VALUE | TARGET TEMPERATURE | UPPER LIMIT DEPTH OF CHARGE | |
|---|---|---|---|---|---|
| | | | | STORAGE BATTERY | BATTERY CELL |
| EXAMPLE 1 | 37° C. | 1 | 44° C. | 1.00 | — |
| EXAMPLE 2 | 37° C. | 0.6 | 44° C. | 1.00 | — |
| EXAMPLE 3 | 37° C. | 1 | 45° C. | 1.00 | — |
| EXAMPLE 4 | 37° C. | 1 | 49° C. | 0.90 | — |
| EXAMPLE 5 | 37° C. | 1 | 49° C. | — | 0.90 |
| COMPARATIVE EXAMPLE 1 | 37° C. | 1 | 44° C. | — | — |
| COMPARATIVE EXAMPLE 2 | 37° C. | 1 | 44° C. | — | — |

| | ALLOWABLE CAPACITY DETERIORATION RATE | CALCULATED ALLOWABLE CAPACITY DETERIORATION RATE | CAPACITY DETERIORATION RATE AFTER 100 CYCLES | CAPACITY RETENTION AFTER 1000 CYCLES | POWER CONSUMPTION |
|---|---|---|---|---|---|
| EXAMPLE 1 | 0.0150% | 0.0145% | 1.44% | 86.6% | 0.50 |
| EXAMPLE 2 | 0.0150% | 0.0145% | 1.43% | 86.7% | 0.25 |
| EXAMPLE 3 | 0.0160% | 0.0150% | 1.49% | 86.2% | 0.22 |
| EXAMPLE 4 | 0.0160% | 0.0153% | 1.52% | 85.9% | 0.17 |
| EXAMPLE 5 | 0.0160% | 0.0153% | 1.50% | 86.1% | 0.17 |
| COMPARATIVE EXAMPLE 1 | — | — | 0.75% | 92.8% | 1.00 |
| COMPARATIVE EXAMPLE 2 | — | — | 1.24% | 88.3% | 0.71 |

| | AMBIENT TEMPERATURE | CALORIFIC VALUE | TARGET TEMPERATURE | UPPER LIMIT DEPTH OF CHARGE | |
|---|---|---|---|---|---|
| | | | | STORAGE BATTERY | BATTERY CELL |
| EXAMPLE 1 | 37° C. | 1 | 44° C. | 1.00 | — |
| EXAMPLE 2 | 37° C. | 0.6 | 44° C. | 1.00 | — |
| EXAMPLE 3 | 37° C. | 1 | 45° C. | 1.00 | — |
| EXAMPLE 4 | 37° C. | 1 | 49° C. | 0.90 | — |
| EXAMPLE 5 | 37° C. | 1 | 49° C. | — | 0.90 |
| COMPARATIVE EXAMPLE 1 | 37° C. | 1 | 44° C. | — | — |
| COMPARATIVE EXAMPLE 2 | 37° C. | 1 | 44° C. | — | — |

-continued

| | ALLOWABLE CAPACITY DETERIORATION RATE | CALCULATED ALLOWABLE CAPACITY DETERIORATION RATE | CAPACITY DETERIORATION RATE AFTER 100 CYCLES | CAPACITY RETENTION AFTER 1000 CYCLES | POWER CONSUMPTION |
|---|---|---|---|---|---|
| EXAMPLE 1 | 0.0150% | 0.0145% | 1.44% | 86.6% | 0.50 |
| EXAMPLE 2 | 0.0150% | 0.0145% | 1.43% | 86.7% | 0.25 |
| EXAMPLE 3 | 0.0160% | 0.0150% | 1.49% | 86.2% | 0.22 |
| EXAMPLE 4 | 0.0160% | 0.0153% | 1.52% | 85.9% | 0.17 |
| EXAMPLE 5 | 0.0160% | 0.0153% | 1.50% | 86.1% | 0.17 |
| COMPARATIVE EXAMPLE 1 | — | — | 0.75% | 92.8% | 1.00 |
| COMPARATIVE EXAMPLE 2 | — | — | 1.24% | 88.3% | 0.71 |

As shown in Table 1, when the electric power consumption in the case where the four fans were constantly operating (Comparative Example 1) was assumed to be 1, in Comparative Example 2, although the four fans were operating, all the fans were stopped every time the temperature in the rack fell below the target temperature by two degrees C., and thus the electric power consumption was 0.71.

On the other hand, in Example 1, since the number of operating fans was two, the electric power consumption was 0.50. In Example 2, since the number of operating fans was one, the electric power consumption was 0.25. In Examples 3 to 5, the number of operating fans was one, but the temperature in the rack was lower than the target temperature by 10 degrees C. or more, and the fans were temporarily stopped. Therefore, the electric power consumption of Example 3 was 0.22, and the electric power consumptions of Examples 4 and 5 were 0.17. As described above, compared with the electric power consumption of Comparative Example 1, in Examples 1 to 5, the electric power consumption could be reduced to half or less.

In the power management device 10 and the power storage system 100 described above, the air volume of the fan 23 is controlled based on the status information indicating the status of the power storage system 100 and the target temperature in the rack 20. The target temperature in the rack 20 is calculated based on the allowable capacity deterioration rate of the storage battery 71. Since the allowable capacity deterioration rate is set to a value capable of securing the capacity retention in the specified number of cycles, an appropriate target temperature can be obtained from the viewpoint of the capacity retention (improvement in cycle characteristics). As a result, the temperature management in the rack 20 can be improved.

The ambient temperature of the rack 20 and the calorific value in the rack 20 may affect the temperature in the rack 20. Therefore, by considering the ambient temperature of the rack 20 and the calorific value in the rack 20, it is possible to further improve the temperature management in the rack 20.

The upper limit depth of charge of the storage battery 71 may affect the deterioration rate of the storage capacity. In the above-described embodiment, the calculation unit 12 calculates the upper limit depth of charge of the storage battery 71 based on the allowable capacity deterioration rate, and the charge/discharge control unit 14 charges the storage battery 71 at the upper limit depth of charge. Therefore, by charging the storage battery 71 at the upper limit depth of charge that satisfies the allowable capacity deterioration rate, it is possible to secure the capacity retention in the specified number of cycles.

The upper limit depth of charge of the battery cell may affect the degradation rate of the storage capacity of the battery cell. It possible to secure the capacity retention in the specified number of cycles by the charge/discharge control unit 14 charging each battery cell at the upper limit depth of charge.

In the above-described embodiment, the air volume control unit 13 calculates the required air volume based on the status information and the target temperature, and controls the air volume of the fan 23 based on the required air volume. For example, the temperature in the rack 20 can be set to the target temperature by adjusting the air volume of the fan 23 (the number of operating fans) so as to satisfy the required air volume.

When the required air volume cannot be obtained by the fans 23 included in the power storage system 100, the calculation unit 12 raises the target temperature within a range satisfying the allowable capacity deterioration rate. The higher the target temperature is, the smaller the required air volume is. Therefore, by raising the target temperature, it is possible to increase the possibility of obtaining the required air volume.

Further, since the required air volume and the upper limit depth of charge are appropriately calculated according to the status of the power storage system 100, it is possible to reduce the electric power consumptions of the fans 23. As a result, electric power obtained from renewable energy can be effectively used.

The power management device and the power storage system according to the present disclosure are not limited to the above-described embodiments.

For example, the power feeding system 1 may not include at least one of the auxiliary power supply device 4 and the auxiliary power supply device 5. In a case where the power feeding system 1 does not include the auxiliary power supply device 5, the power feeding system 1 is also referred to as an independent DC power feeding system.

At least one of the power conditioner 32, the AC/DC converter 42, the AC/DC converter 52, the converter 6, and the bidirectional DC/DC converter 73 may not have the power measurement function. In this case, the power management device 10 may acquire the measured value of each electric power from the measured value of the voltage measured by the voltage sensor and the measured value of the current measured by the current sensor.

The power management device 10 may be configured by one physically or logically coupled device, or may be configured by two or more devices that are physically or logically separated from each other. For example, the power management device 10 may be implemented by a plurality of computers distributed over a network, such as cloud computing.

The power management device 10 may be provided outside the rack 20. That is, the power management device 10 may not be housed in the rack 20.

In the above-described embodiment, the air volume control unit 13 controls (adjusts) the air volume by changing the number of operating fans 23. However, the air volume control unit 13 may control (adjust) the air volume by changing the number of rotations of the fans 23.

REFERENCE SIGNS LIST

1 Power feeding system
7 Power storage device
10 Power management device
11 Acquisition unit
12 Calculation unit
13 Air volume control unit
14 Charge/discharge control unit
15 Acquisition unit (first acquisition unit)
16 Acquisition unit (second acquisition unit)
20 Rack (housing)
23 Fan
71 Storage battery
100 Power storage system

The invention claimed is:

1. A power management device for controlling a temperature inside a housing in a power storage system, the power storage system including a power storage device including a storage battery and the housing for housing the power storage device, the power management device comprising:
an acquisition unit configured to acquire status information indicating a status of the power storage system;
a calculation unit configured to calculate a target temperature in the housing based on an allowable capacity deterioration rate of the storage battery; and
an air volume control unit configured to control air volumes of fans provided in the housing based on the status information and the target temperature,
wherein the acquisition unit includes:
a first acquisition unit configured to acquire an ambient temperature of the housing, which is a temperature detected by a temperature sensor provided outside the housing, as the status information; and
a second acquisition unit configured to acquire a calorific value, which is an amount of heat generated in the housing, as the status information,
wherein the air volume control unit calculates a required air volume, which is required to set the temperature inside the housing to the target temperature, based on the calorific value, the ambient temperature, and the target temperature, and operates a required number of fans required to obtain the required air volume, and
wherein the air volume control unit operates all the fans when the temperature inside the housing is higher than the target temperature.

2. The power management device according to claim 1, further comprising a charge/discharge control unit configured to control charging and discharging of the storage battery,
wherein the calculation unit further calculates an upper limit depth of charge of the storage battery based on the allowable capacity deterioration rate, and
wherein the charge/discharge control unit charges the storage battery at the upper limit depth of charge.

3. The power management device according to claim 2, wherein the storage battery includes a plurality of battery cells, and
wherein the charge/discharge control unit charges each of the plurality of battery cells at the upper limit depth of charge.

4. The power management device according to claim 1, wherein the calculation unit increases the target temperature within a range satisfying the allowable capacity deterioration rate when the required air volume cannot be obtained by the fan.

5. A power storage system comprising:
a power storage device including a storage battery;
a housing configured to house the power storage device;
fans provided in the housing; and
a power management device configured to control a temperature inside the housing,
wherein the power management device controls air volumes of the fans based on a target temperature in the housing calculated based on an allowable capacity deterioration rate of the storage battery and status information indicating a status of the power storage system,
wherein the power management device acquires an ambient temperature of the housing, which is a temperature detected by a temperature sensor provided outside the housing, as the status information and a calorific value, which is an amount of heat generated in the housing, as the status information,
wherein the power management device calculates a required air volume, which is required to set the temperature inside the housing to the target temperature, based on the calorific value, the ambient temperature, and the target temperature, and operates a required number of fans required to obtain the required air volume, and
wherein the power management device operates all the fans when the temperature inside the housing is higher than the target temperature.

* * * * *